United States Patent
Schubert

[19]

[11] Patent Number: 6,030,055
[45] Date of Patent: Feb. 29, 2000

[54] METHOD AND DEVICE FOR REGULATING THE PRESSURE IN AT LEAST ONE WHEEL BRAKE

[75] Inventor: Michael Schubert, Althengstett, Germany

[73] Assignee: Robert Bosch GmbH, Stuttgart, Germany

[21] Appl. No.: 09/030,412

[22] Filed: Feb. 25, 1998

[30] Foreign Application Priority Data

Feb. 27, 1997 [DE] Germany .......................... 197 07 960

[51] Int. Cl.[7] ........................................... B60T 8/40
[52] U.S. Cl. .............................. 303/113.4; 303/3; 303/10; 303/116.1; 303/166; 303/DIG. 3; 303/DIG. 4; 303/15
[58] Field of Search .................................... 303/113.4, 166, 303/167, 155, DIG. 3, DIG. 4, 119.1, 119.2, 117.1, 119.3, 3, 15, 162, 20, 10, 116.1, 113.2, DIG. 1, DIG. 2, 198

[56] References Cited

U.S. PATENT DOCUMENTS

| | | | |
|---|---|---|---|
| 4,462,642 | 7/1984 | Leiber | 303/113.4 |
| 4,664,452 | 5/1987 | Kubota et al. | 303/DIG. 3 |
| 4,805,105 | 2/1989 | Weiss et al. | 303/DIG. 3 |
| 5,150,951 | 9/1992 | Leiber et al. | 303/186 |
| 5,261,730 | 11/1993 | Steiner et al. | 303/113.4 |
| 5,411,323 | 5/1995 | Takahashi et al. | 303/117.1 |
| 5,545,929 | 8/1996 | Fijioka et al. | 303/166 |
| 5,551,770 | 9/1996 | Hrovet et al. | 303/167 |
| 5,577,812 | 11/1996 | Hirano et al. | 303/DIG. 4 |
| 5,636,910 | 6/1997 | Kost et al. | 303/155 |
| 5,669,678 | 9/1997 | Stumpe et al. | 303/166 |
| 5,727,854 | 3/1998 | Pueschel et al. | 303/166 |
| 5,782,541 | 7/1998 | Schappler | 303/3 |
| 5,806,938 | 9/1998 | Stumpe et al. | 303/155 |

FOREIGN PATENT DOCUMENTS

WO 95/14595 6/1995 WIPO .

*Primary Examiner*—Douglas C. Butler
*Attorney, Agent, or Firm*—Kenyon & Kenyon

[57] ABSTRACT

A method and device for regulating the pressure in at least one wheel brake, such that a controller is provided for pressure regulation which forms at least one activation signal magnitude for a pressure-influencing valve arrangement on the basis of, among other things, a stored correlation between the activation signal magnitude and the pressure conditions at the valve arrangement. The method and device allow for the correlation to be adapted to changes to the braking system during operation.

19 Claims, 5 Drawing Sheets

METHOD AND DEVICE FOR REGULATING THE PRESSURE IN AT LEAST ONE WHEEL BRAKE

FIELD OF THE INVENTION

The present invention relates to a method and device for regulating the pressure in at least one wheel brake.

BACKGROUND INFORMATION

A conventional method and device are described, for example, in International Patent No. WO 95/14595, which describes a hydraulic vehicle braking system operated by an external force. The system is equipped with valves that can be controlled to enter into intermediate positions by a corresponding flow control system using a control device. In this context, the pressure at the wheel brakes is sensed and compared with the pressure at a main brake pressure transmitter, and the valves are controlled in such a way that the pressure set at the main brake pressure transmitter is regulated. However, detailed information regarding the controller to be used in the control unit is not provided in this prior art.

German Patent Application No. 196 54 427.0 of Dec. 24, 1996 (not previously published) describes a pressure controller for the pressure in at least one wheel brake. The valve current that is outputted from this controller to regulate the pressure buildup and pressure reduction is composed of a controlled component, which is derived from stored valve characteristic curves, and a correction component which is formed from the control deviation between the reference and actual pressures. The valve characteristic curve for pressure buildup and pressure reduction contains the information, necessary for regulation, as to which differential pressure is established at the valve for the respective activation current. It has been found that these characteristic curves, which define the operating point of the pressure controller for pressure buildup and pressure reduction, must be determined with a high degree of accuracy in order to achieve an adequate control quality. And, manufacturing tolerances and aging processes in the valves have a substantial detrimental influence on the accuracy of the characteristic curves.

SUMMARY OF THE INVENTION

The present invention improves upon the quality of conventional pressure regulation systems.

According to the present invention, the correlation between the pressure difference at the valve and the activation current, which represents a controlled component for the activation signal that is outputted from a controller, is automatically equalized. This automatic equalization results in several advantages. First, manual determination and adjustment of this correlation for each regulating valve become unnecessary.

Automatic equalization also substantially increases the accuracy of the correlation and the characteristic curve describing the correlation, and thus, the quality of the pressure regulation performed on the basis of the characteristic curve.

It is particularly advantageous that automatic equalization makes it possible to use regulating valves that can be affected by manufacturing tolerances and aging processes without detrimentally affecting the characteristic curves.

Additionally, automatic equalization of the parameters of the characteristic curve ensures a consistent pressure regulation control quality over the entire service life of the motor vehicle equipped with the pressure regulation system.

A further advantage results from the fact that automatic equalization improves regulation quality.

Another advantage of the present invention is that automatic equalization can be performed during normal driving operation, and requires no additional test cycles.

Moreover, according to the present invention, it is possible that during a first adaptation of the characteristic curves, for example during an end-of-line inspection, both the offset and the slope of the characteristic curve which describes the correlation between activation current and pressure difference at the valve are determined in the context of a test cycle in which various pressure ranges can be automatically cycled through.

Furthermore, the present invention makes it possible that, during the test cycle upon the first adaptation, a recording of defined characteristic curve points and, thus, a recording of the characteristic curve itself can also be performed.

DETAILED DESCRIPTION

Figure 1:
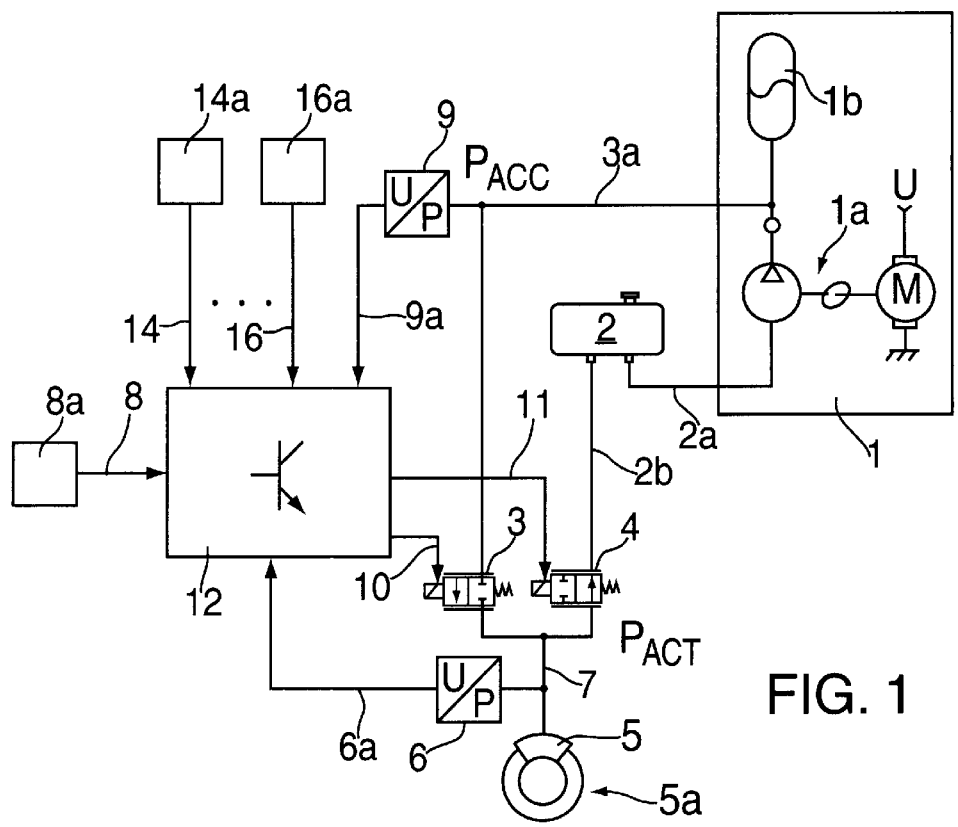
FIG. 1 shows an electrically controlled braking system using the example of a wheel brake.

FIG. 1 shows a control system for the braking system of a vehicle using the example of an individual wheel brake. The control system is comprised of a conventional pressure supply 1 which can include, for example, an electrohydraulic pump 1a and a gas-pressure piston accumulator 1b. Also provided is a fluid reservoir 2 which feeds fluid to pressure supply 1, and receives fluid when pressure at the wheel brake is reduced. For this purpose, a line 2a connects reservoir 2 to the intake-side inlet of pump 1a, while a second line 2b leads from reservoir 2 to the valve arrangement for controlling the brake pressure in the wheel brake. Brake caliper 5 of wheel 5a is connected via a pressure line 7 to the valve arrangement for controlling the brake pressure in the wheel brake cylinder. In a preferred embodiment, the valve arrangement includes two solenoid seat valves, a valve 3 for pressure buildup and a valve 4 for pressure reduction. In the zero-flow position, magnetic seat valve 3 for pressure buildup is closed, and valve 4 for pressure reduction is either open or closed.

Valve 4 is connected via line 2b to fluid reservoir 2, while valve 3 is connected via a line 3a to pressure supply 1, and from there to the delivery line of pump 1a.

To sense the brake pressure in brake caliper 5 of wheel 5a, a pressure sensor 6 is provided which senses the pressure in line 7, the pressure in the wheel brake cylinder, and the actual pressure $P_{Act}$, and sends a corresponding electrical signal via line 6a to control unit 12. The pressure in brake line 3a, called the accumulator pressure $P_{Acc}$, is correspondingly sensed by a pressure sensor 9, and a corresponding electrical signal is sent via line 9a to control unit 12. Control unit 12 contains, among other things, a pressure controller, and the control unit activates solenoid valves 3 and 4 via output lines 10 and 11 to regulate the brake pressure in brake caliper 5.

From a measurement device 8a for sensing the driver's braking input (e.g., from a travel sensor, force sensor and/or pressure sensor connected to the brake pedal) at least one electrical signal corresponding to the brake pedal actuation is conveyed via line 8 to control unit 12. Input lines 14 to 16 from measurement devices 14a to 16a are also conveyed to control unit 12, which sense operating variables of the motor vehicle that are relevant in the context of the brake control system. Such operating variables are, for example, wheel rotation speeds, axle loads, optionally atmospheric pressure, etc. These signals are used in the context of conventional antilock braking control systems, automatic slip control systems, vehicle dynamics control systems, axle-load-dependent control systems, etc., or, in the pressure regulation system itself if an atmospheric pressure is taken into account.

Control unit 12 senses, via line 8, an indicator of brake pedal actuation, which it converts, by an analysis of characteristic curves, characteristic diagrams, tables, or calculation steps, optionally taking into account further operating variables that are conveyed via lines 14 to 16, into a reference pressure $P_{Ref}$ that is derived from the pressure indicated by the driver and taking into account the prevailing operational conditions. In this context, this reference pressure can be determined for each wheel brake at each individual wheel, or for the brakes of an axle. This reference pressure is then compared with the actual pressure in at least one wheel brake caliper sensed by measurement device 6, and the pressure in at least one wheel brake is adjusted to the reference pressure, in the context of the pressure regulation system described below, by activating at least one of solenoid valves 3 or 4. A pressure regulation circuit of this kind is provided for each electrically controllable wheel brake of the vehicle. In the preferred exemplary embodiment, the activation signals sent out by control unit 12 via lines 10 and 11 are pulse-width modulated signals which lead to an average energizing current and thus, to a force application which guides the activated valve into the requisite intermediate position.

In the preferred embodiment shown in FIG. 1, the solenoid valve arrangement is implemented with two 2-way valves which are also used in conventional ABS systems. In other exemplary embodiments, a valve with two seats, two armatures, and one electrical connection is used instead of the two valves 3 and 4. Moreover, in a further exemplary embodiment, instead of directly sensing the brake pressure by means of pressure sensor 6, the pressure effect can be derived by detecting the braking force from deflections at elements of the brake caliper or of its attachment, or by means of a model using the magnitude and duration of the valve activation.

Furthermore, in another exemplary embodiment, instead of the switched current generators activating the valve arrangement with pulse-width modulated signals, regulated current generators are used, in which, in the context of a regulating circuit, the current determined by the pressure controller (constituting the reference value) is compared with an actual current through the coil of the activated solenoid valve as sensed at the valve arrangement, and regulated accordingly.

Figure 2:
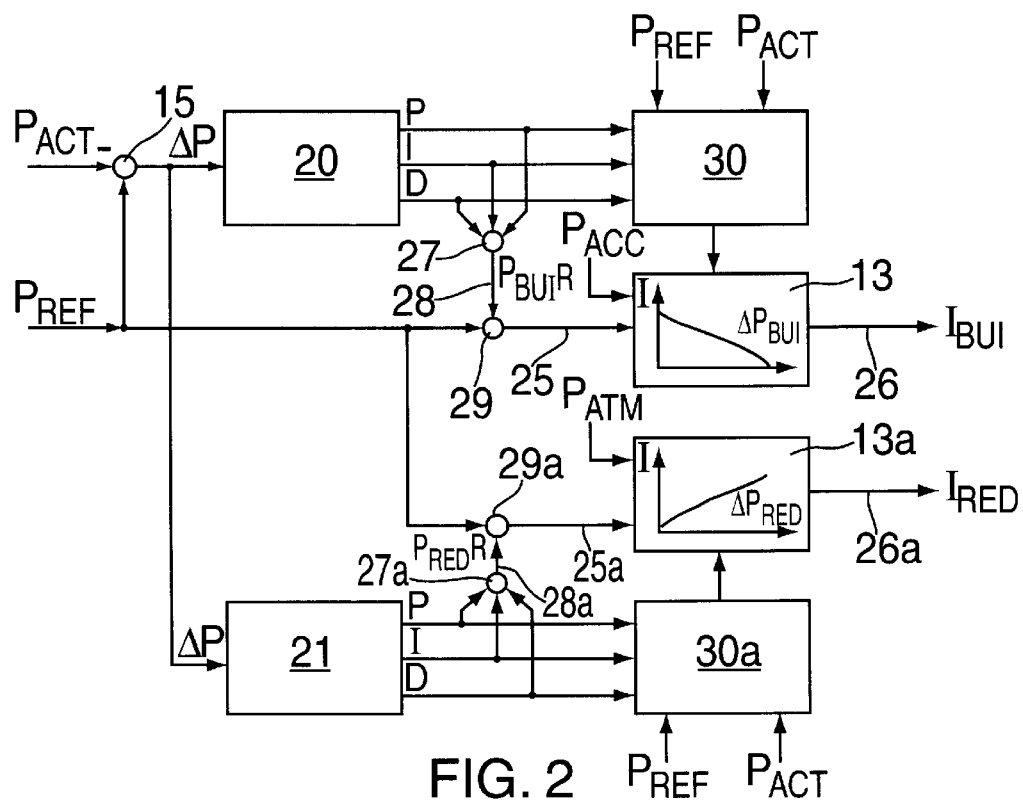
FIG. 2 is a block diagram showing the pressure controller for continuous pressure regulation at a wheel brake with means for adaptation of the characteristic curve.

FIG. 2 depicts, as a block diagram, the pressure controller implemented in a microcomputer of control unit 12. The reference pressure $P_{Ref}$ derived from the brake pedal actuation, the actual pressure $P_{Act}$ sensed by the pressure sensor, and the determined accumulator pressure $P_{Acc}$ are conveyed to the controller. Moreover, in a preferred exemplary embodiment, the atmospheric pressure ($P_{Atm}$, pressure in reservoir 2) is determined and conveyed to the pressure controller. The reference pressure and actual pressure are conveyed to a comparator 15 which forms the difference $\Delta P$ between the reference and actual pressure. At least this difference is utilized to decide whether pressure is to be built up or reduced in the wheel brake. If the deviation is positive, i.e. if reference pressure is higher than actual pressure, pressure buildup controller 20 is activated. If the deviation is negative, pressure reduction controller 21 is activated. In an equalized situation, when the actual value substantially corresponds to the reference value, the controllers are inactive. In an exemplary embodiment, a dead zone around the equalization point can be provided for this purpose.

Also, in an exemplary embodiment, the switch over from controller 21 to controller 20 and vice versa would have a hysteresis characteristic in order to prevent continuous switching back and forth between the two controllers. The elements required for switch over and shutdown are not shown in FIG. 2 for reasons of clarity.

Also provided are predetermined current/pressure characteristic curves for pressure buildup and pressure reduction (13, 13a). These characteristic curves describe the relationship between the activation current for the corresponding valve and the pressure difference across that valve. Accumulator pressure $P_{Acc}$ influences characteristic curve 13 for pressure buildup, since the critical variable for the equalization of forces at the corresponding solenoid valve is the differential pressure at the seat of that valve. With an ideal pressure supply, characteristic curve 13 would be a straight line; but using a typical pressure supply, the characteristic curve must be adapted to the influence of pressure supply 1 by selecting, using a measurement of the accumulator pressure and a characteristic curve for the present accumulator pressure. Characteristic curve 13 shows the current $I_{Bui}$ as a function of the differential pressure $\Delta P$ at valve 3; i.e., the difference between the conveyed accumulator pressure $P_{Acc}$ and the pressure value derived from the reference pressure $P_{Ref}$ (brake pressure to be established, which corresponds to the actual pressure when the system is equalized) and conveyed via line 25. During operation, the current $I_{Bui}$ is then derived from characteristic curve 13 as a function of the input variables, and the value determined in this fashion is output via line 26.

Alongside characteristic curve 13 for pressure buildup, characteristic curve 13a for pressure reduction is depicted in analogous fashion. This describes the dependence of current $I_{Red}$ on the pressure difference $\Delta P$ across reduction valve 4, using the example of a reduction valve that is open in the absence of current.

The pressure difference is the difference between the pressure value derived from the reference pressure (brake pressure to be established, which corresponds to the actual pressure when the system is equalized) and conveyed via line 25a and the atmospheric pressure prevailing in reservoir 2. The signal derived from the reference pressure and optionally also the atmospheric pressure $P_{Atm}$—which, in an exemplary embodiment, is regarded as a fixed value—are therefore conveyed to characteristic curve 13a via line 25a. And during operation, the current $I_{Red}$ for pressure reduction is determined as a function of the pressure difference, and then outputted via line 26a.

Depending on the operating state (pressure buildup, pressure reduction, pressure hold), which is determined as explained above on the basis of the system deviation ΔP, either the current $I_{Bui}$ or the current $I_{Red}$ or neither of the two currents is outputted. The corresponding switching element which makes this determination is not depicted in FIG. 2 for reasons of simplicity. In a preferred embodiment, the transition between pressure buildup and pressure reduction occurs abruptly. In other exemplary embodiments, this transition occurs in delayed fashion, by using controlled current ramps to fade out the operating state being left, and fade in the new operating state.

Controllers 20 and 22 determine—according to a defined regulation strategy (which exhibits proportional, integral, and differential behavior in a preferred exemplary embodiment) and as a function of the difference ΔP between the reference and actual pressure—controller output signals P, I, and D through which the actual pressure value approaches the reference value. The controller output signals are combined, at summing points 27 and 27a, into a controller output signal $P_{BuiR}$ or $P_{RedR}$.

This is conveyed via line 28 or 28a to a summing point 29 or 29a. At this summing point, the controller pressure value is superimposed onto the defined reference pressure value $P_{Ref}$, and a corrected reference pressure signal is formed and is conveyed via line 25 or 25a to characteristic curve 13 or 13a.

The controller correction value here represents the component by which the output signal $I_{Bui}$ or $I_{Red}$ must be corrected in order to achieve equalization of the actual and reference pressures. In other words, the component output by the controller represents a correction of characteristic curve 13 or 13a. If the characteristic curve current is too high during pressure buildup, the inlet valve is opened even without a correction component. A pressure overshoot and a non-steady state control profile will occur. If the characteristic curve current is too low, the missing amount must be compensated for by the correction component, which is expressed as a greater control deviation and poorer command behavior. The magnitude of the correction component required for pressure regulation (output of controller 20 or 21) is thus both an indication of the accuracy of the stored characteristic curve and an indication of regulation quality. Optimum adjustment of the actual value to the reference pressure value would be achieved if the adjustment were made with no correction component for the controller(s).

To prevent unfavorable controller behavior, as outlined above, from occurring as a result of manufacturing tolerances and aging phenomena, characteristic curves 13 and 13a are corrected, on the basis of the controller output signal or a portion of the controller output signal, in such a way that controller 20 or 21 must intervene as little as possible to bring the actual pressure close to the reference pressure. For this purpose, adaptation elements 30 and 30a, to which at least one of the controller output signals (P, I and D), in particular the I component, is conveyed on the one side and associated with characteristic curves 13 and 13a. The reference and actual pressure values ($P_{Ref}$ and $P_{Act}$) are also conveyed to the adaptation elements.

The correction component occurring in the course of a regulation operation is held within defined limits by appropriate adaptation of the characteristic curves. For this, a reference range, which depends on the dynamic ratio of the reference pressure (change over time) and the actual pressure level, is defined for the correction curve. In a preferred exemplary embodiment, only the integral controller signal (I) is conveyed to the adaptation element. In other exemplary embodiments, the summed value, other individual controller components, or any desired combination of two controller components can be conveyed to the adaptation element and monitored. If the correction component in question lies within the defined reference range during a regulation operation, it is assumed that an adequate regulation quality has been achieved, and no adaptation is performed. If, during pressure buildup, the correction component exceeds the limit of the reference range in the direction of greater pressure values (greater currents), the characteristic curve value is shifted upward; if the value falls below the limit of the reference range, a downward shift occurs. The size of the characteristic curve shift is calculated, in this context, from the magnitude of the deviation from the limit of the reference range, for example by means of a gain factor. The adaptation element then acts as a superimposed control loop for the correction component, which is set to a predetermined value, preferably to a center value. During pressure reduction, the characteristic curve value is shifted upward toward greater pressure reduction (i.e., higher currents), if the correction component exceeds the limit of the reference range; while the characteristic curve value is shifted downward (i.e., toward lower currents) if the correction component falls below the limit of the reference range.

In a preferred embodiment, the aforementioned method is used to equalize the valve characteristic curve at the various characteristic curve points, and thus determine its shape and slope. In a first exemplary embodiment, each characteristic curve point (I/ΔP) that occurs is adapted. In a second exemplary embodiment, the characteristic curve is divided into pressure ranges, such that the differential pressure present during adaptation determines the pressure range and thus the characteristic curve section to be modified. In this case the selected characteristic curve section is shifted in accordance with the adaptation value. In a third and simplest exemplary embodiment, the entire characteristic curve is shifted in parallel in accordance with the adaptation value.

Figure 6A:
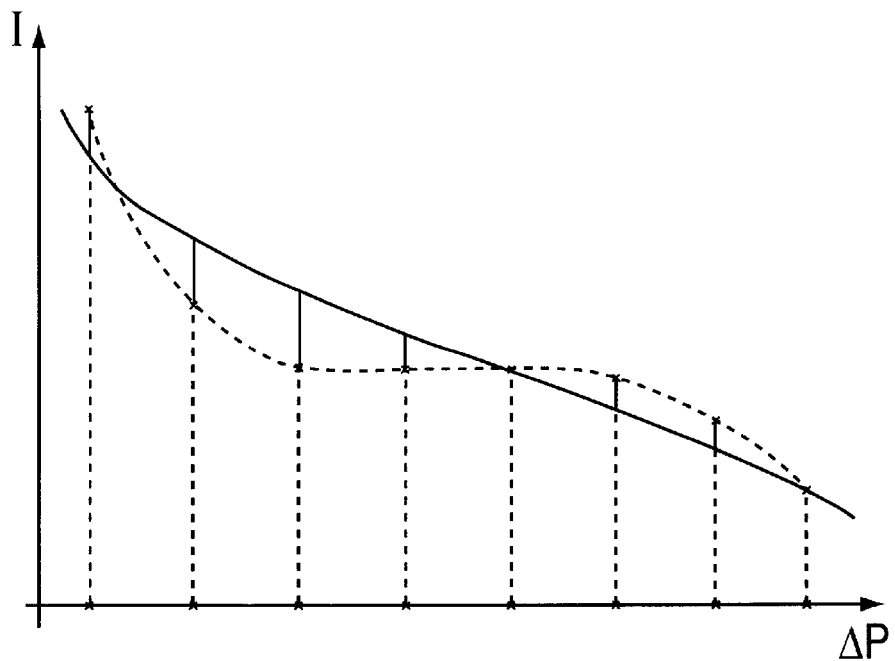
FIG. 6a shows, by way of example, a characteristic curve and the effects of adaptation to that characteristic curve in an exemplary embodiment.
Figure 6B:
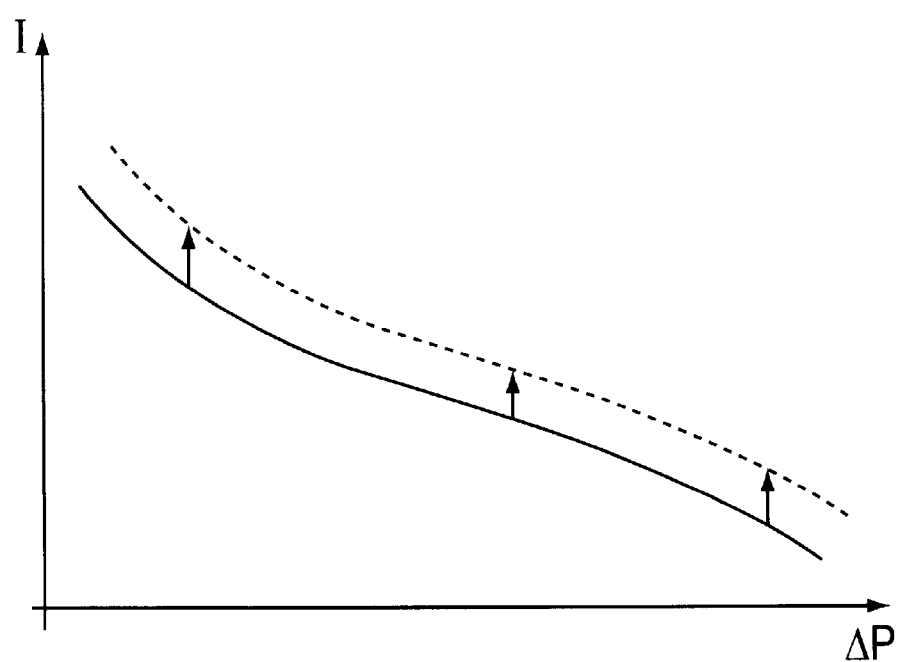
FIG. 6b shows, by way of example, a characteristic curve and the effects of adaptation to that character characteristic curve in a further exemplary embodiment.

FIG. 6a depicts, by way of example, the first exemplary embodiment, in which the effect of adaptation on characteristic curve 13 at specific characteristic curve points. Several corrections of the characteristic curve are plotted at individual points and thus lead, over time, to the new characteristic curve profile drawn with dashed lines. FIG. 6b shows a parallel shift of the entire characteristic curve depicting the third exemplary embodiment, which occurs in order to compensate for aging processes during operation. The characteristic curve is shifted in parallel fashion by the adaptation element, at one operating point, by a specific amount, resulting in the adapted characteristic curve plotted with dashed lines.

Figure 3:
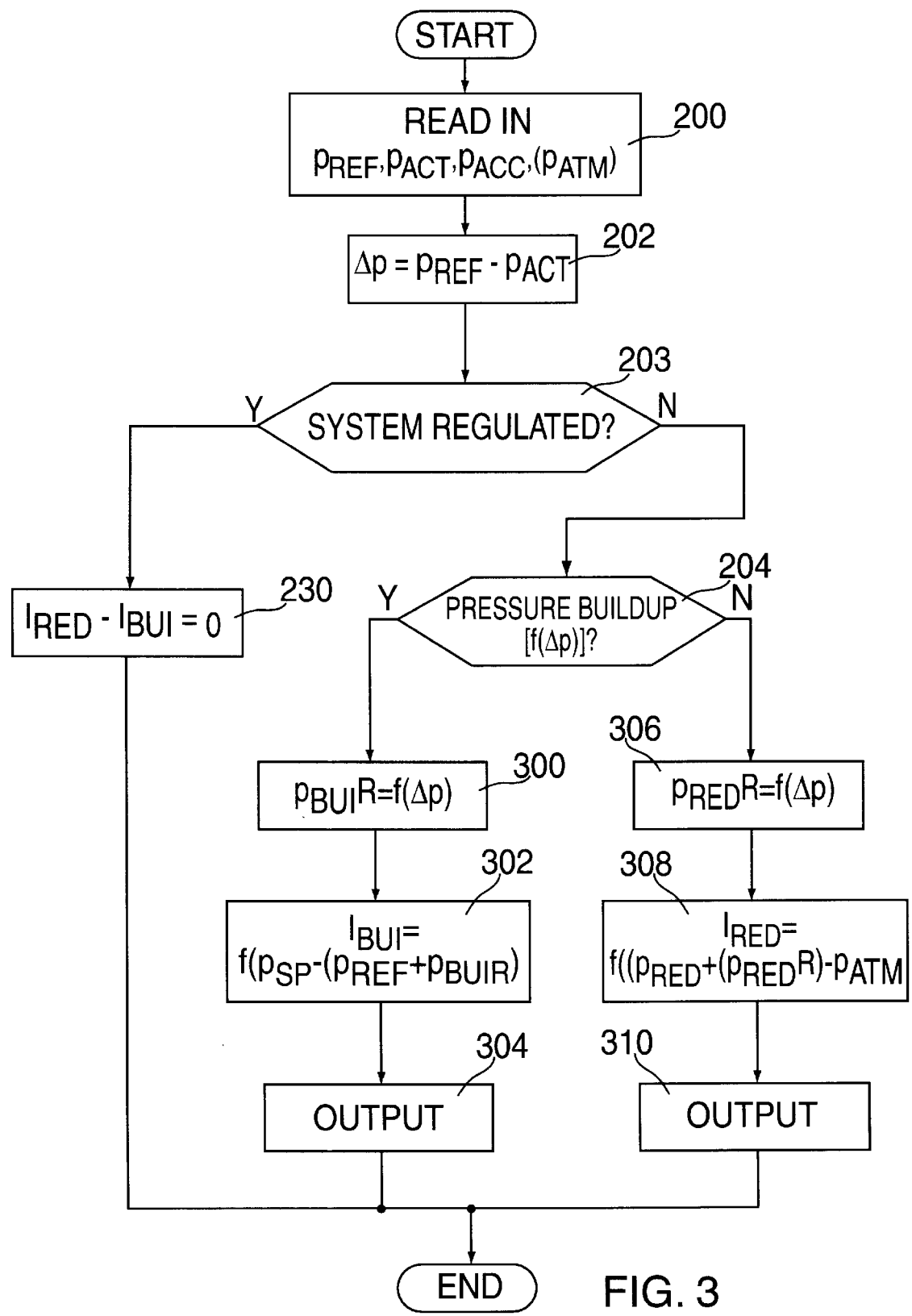
FIG. 3 shows a preferred embodiment of the controller as a program of a microcomputer of a control unit.

In a preferred embodiment, the controller depicted in FIG. 2 is implemented as a program of a microcomputer. A flow diagram which depicts such a program is outlined in FIG. 3. In the first step 200, the requisite variables—reference value $P_{Ref}$, actual value $P_{Act}$, accumulator pressure value $P_{Acc}$ and optionally atmospheric pressure $P_{Atm}$—are read in at defined points in time. In the subsequent step 202, the difference ΔP between the reference pressure and actual pressure is formed. Then in step 203, a check is made as to whether the regulation system is in the regulated state, i.e. whether the actual value corresponds substantially to the reference value.

This is preferably achieved by comparing the difference with a limit value that is zero or lies close to zero. Then in step 230, if the regulation system is in the regulated state, the variables to be outputted—$I_{Bui}$ and $I_{Red}$—are set to zero, i.e. the regulation system is set to passive mode. If the regulated state has not been reached, in step 204 a check is made as to whether a pressure buildup should take place. This is done on the basis of the pressure difference, governed by a hysteresis.

If the pressure difference is above the threshold value for pressure buildup, then in step 300 the correction value $P_{BuiR}$ is formed by the controller on the basis of the system deviation. Then in step 302, the variable $I_{Bui}$ is calculated from characteristic curve 13, as a function of the difference between the reservoir pressure and the sum of the reference value and the correction value, and outputted in step 304. For pressure reduction, in step 306 the correction variable $P_{RedR}$ is similarly calculated as a function of the differential pressure; then the variable $I_{Red}$, which depends on the difference of the sum of the reference value and correction value and optionally the atmospheric pressure, is read out from characteristic curve 13*a* (step 308), and outputted in step 310. After steps 304, 310 and 230, the program is terminated and repeated at the next point in time.

In another exemplary embodiment, instead of using two controllers, one controller is used which is loaded with appropriate parameters depending on whether pressure is being built up or reduced.

In a further exemplary embodiment, characteristic curves 13 and 13*a* depend not on the reference pressure or a value derived from the reference pressure, but on the actual pressure. Moreover, in another exemplary embodiment, the controller does not correct the reference pressure, but rather corrects the current read out from the characteristic curve as a function of the controller output, which forms a current correction value ($I_{BUiR}$, $I_{RedR}$) on the basis of the difference between reference and actual pressure. In accordance with the aforementioned procedure, the output signal of the controller then constitutes the basis for adaptation of the characteristic curves.

Figure 4:
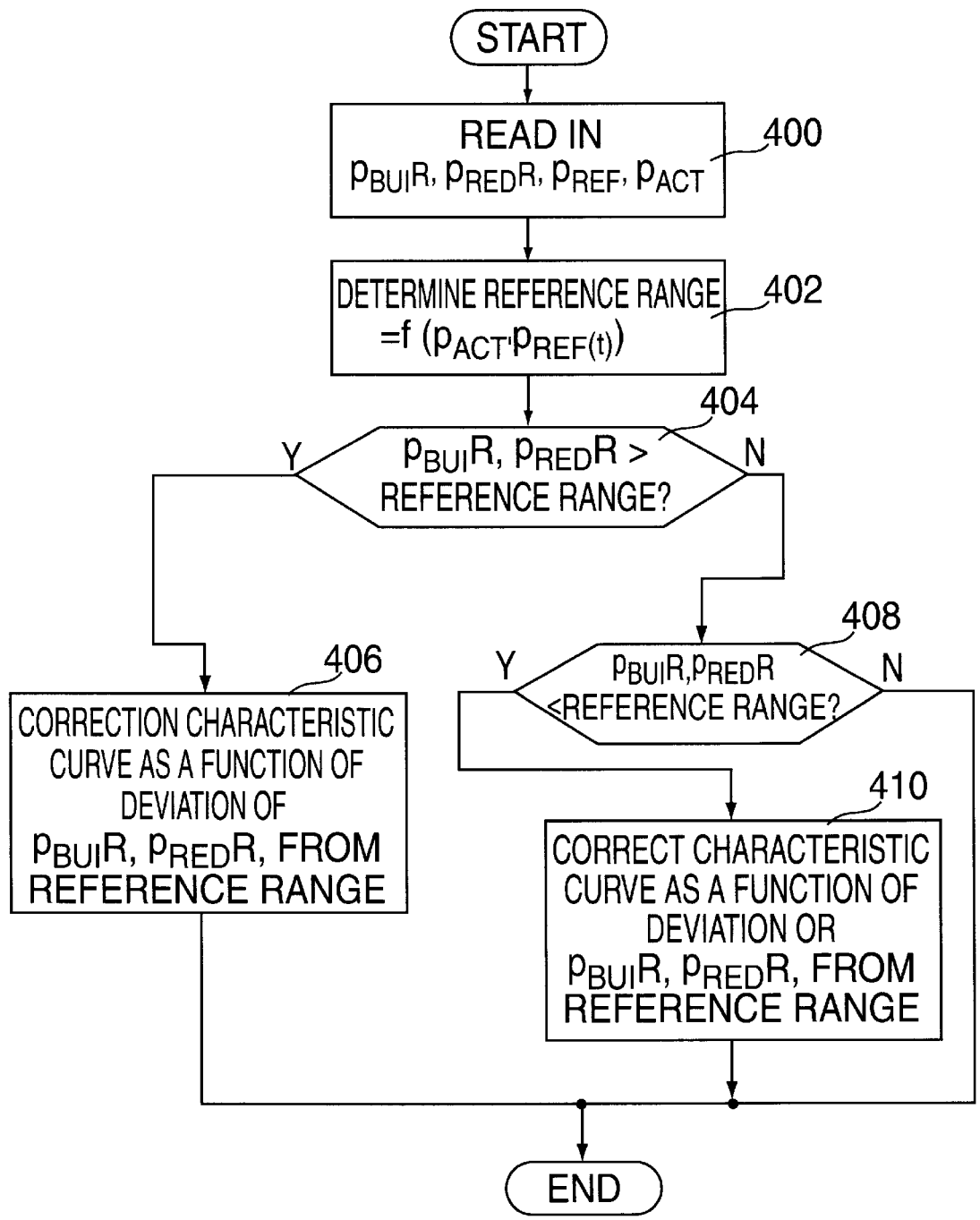
FIG. 4 shows the adaptation of the characteristic curve as a flow diagram in the context of the program shown in FIG. 3.

An example of an implementation of the adaptation of the characteristic curves as a computer program is outlined with reference to the flow diagram in FIG. 4. The program depicted there is initiated at defined points in time. In the first step 400, the reference value $P_{Ref}$, actual value $P_{Act}$, and the controller correction values $P_{BuiR}$ and $P_{RedR}$ are read in. Instead of the controller correction values, individual controller components (output signals P, I and D) or any desired combination of individual controller components can also be read in. Then in step 402, the limits of the reference range for the controller output signals or the individual controller components are determined as a function of the actual pressure $P_{Act}$ and the dynamic ratio of the reference pressure $P_{Ref(t)}$ (i.e., the change over time in the reference pressure). The reference range will increase as the reference pressure dynamic ratio and actual pressure increase. Then in step 404, the correction value $P_{BuiR}$ or correction value $P_{RedR}$ is compared with the limits of the reference range. If the correction value in question exceeds the reference range, then in step 406 a correction of the characteristic curve is made as a function of the magnitude of the deviation of the correction value from the reference range limit. There occurs, in this context, a parallel shift of the entire characteristic curve or, in other exemplifying embodiments, a shift of the present operating point of the characteristic curve or of the present characteristic curve range defined by the differential pressure.

If, in step 410, the correction value 410 is above the upper reference range limit, a check is made in query step 408 as to whether the correction value lies below the lower reference range limit. If this is the case, then in step 404 the adaptation of the characteristic curve is performed as a function of the deviation of the correction value from the lower reference range limit. Here again, either a correction of the entire characteristic curve, a correction of the present characteristic curve point, or a correction of a predetermined characteristic curve range, takes place. If the correction value is within the defined reference range, no adaptation takes place. After step 406 or 410, or if the response is negative in step 408, the program is terminated and runs again at the next point in time.

In a preferred embodiment, the reference range lies around a center position of the controller, which, as a rule, is close to zero. The upper limit therefore has positive values, and the lower has negative or low positive values.

In a preferred embodiment, a parallel shift of the entire characteristic curve occurs during operation only when necessary to compensate for the aging processes. Regulation operations in the lower pressure region, which is present during ordinary braking operations, are therefore sufficient for adaptation. The slope of the characteristic curve, which in the preferred embodiment is assumed to be constant over the service life, must then be determined when the first adaptation is performed (e.g., during an end-of-line inspection).

In a first exemplary embodiment, this is done, with the method just outlined, within a test cycle which automatically cycles through various pressure ranges. In this context, various reference pressures are defined for the controller, and the adaptation program described in FIG. 4 is cycled through for individual characteristic curve points. The characteristic curve points, and thus the characteristic curve itself, are determined in this fashion.

Figure 5:
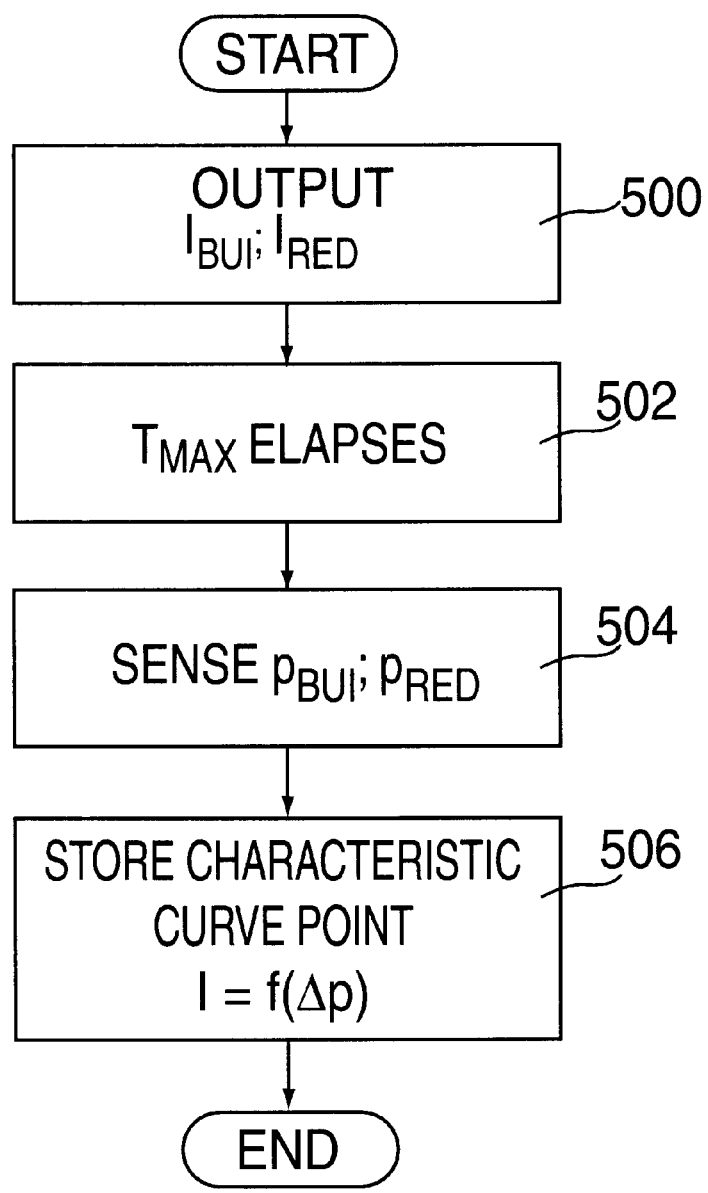
FIG. 5 depicts a flow chart showing an exemplary embodiment for a determination of the characteristic curve, for example in the context of an end-of-line inspection.

In a further exemplary embodiment, the one-time determination of the slope is performed using an alternative method, in which defined current values are outputted during the test cycle and the respective characteristic curve point is determined from the pressure which is established after a certain time. This procedure is depicted with reference to the flow diagram in FIG. 5. Once the program section has been started at defined points in time during a test cycle, for example in the context of end-of-line inspection, in the first step 500 a certain buildup current $I_{Bui}$ or reduction current $I_{Red}$ is output to the corresponding valve. Then in step 502 the program waits for a defined time $T_{Max}$ to elapse. Then in step 504 the actual pressure value $P_{Act}$ and optionally the reservoir pressure $P_{Acc}$ are sensed. In the subsequent step 506 the respective characteristic curve point ($I/\Delta P$) is then determined from the sensed pressure data and the defined current data. The program section terminates after step 506, and at the next point in time is cycled through again with different current values.

What is claimed is:

1. A method for regulating a pressure in at least one wheel brake of a braking system having operating characteristics, the method comprising the steps of:

determining an actual pressure of the at least one wheel brake;

determining a deviation of the actual pressure from a predefined reference brake pressure;

providing a valve arrangement for changing the actual pressure of the at least one wheel brake in response to at least one activation signal;

determining at least one pressure condition at an at least one predetermined point of the valve arrangement;

storing at least one correlation between the at least one activation signal and the at least one pressure condition, the at least one correlation being modified as a function of the operating characteristics of the braking system; and forming the at least one activation signal as a function of the deviation and the at least one correlation, the at least one activation signal activating the valve arrangement.

2. The method according to claim 1, wherein the at least one pressure condition is a pressure difference across the valve arrangement, and wherein the at least one correlation is stored in a plurality of characteristic curves.

3. The method according to claim 1, further comprising the step of:

forming a correction signal in a controller as a function of the reference brake pressure and the actual pressure.

4. The method according to claim 3, wherein the correction signal corrects the at least one activation signal.

5. The method according to claim 3, wherein the correction signal corrects a reference signal from a driver's input.

6. The method according to claim 3, wherein the at least one correlation between the at least one activation signal and the at least one pressure condition is modified as a function of a magnitude of the correction signal.

7. The method according to claim 3, further comprising the steps of:

comparing the correction signal with predetermined upper and lower limit values; and modifying the at least one correlation if the correction signal is not within the predetermined upper and lower limit values.

8. The method according to claim 2, further comprising the steps of:

effecting a parallel shift of at least one of: the plurality of characteristic curves, a preselected plurality of ranges of the plurality of characteristic curves, and individual points in the plurality of characteristic curves.

9. The method according to claim 7, wherein a magnitude of the correction signal is a function of a magnitude of a deviation between the correction signal and the predetermined upper and lower limit values.

10. The method according to claim 1, wherein the at least one correlation is determined, upon a commissioning, in a test cycle by using a plurality of predetermined reference pressure values and a corresponding plurality of activation signals resulting from the plurality of predetermined reference pressure values to form the at least one correlation.

11. The method according to claim 1, wherein the at least one correlation is determined by using a plurality of predetermined activation signals and a corresponding plurality of pressure conditions resulting from the plurality of predetermined activation signals to form the at least one correlation.

12. A device for regulating a pressure in at least one wheel brake of a braking system having operating characteristics, comprising:

means for determining an actual brake pressure in the at least one wheel brake;

means for determining a deviation between a reference brake pressure and the actual brake pressure;

a valve arrangement for changing the actual pressure in the at least one wheel brake in response to at least one activation signal;

means for determining at least one pressure condition at an at least one predetermined point of the valve arrangement;

means for storing at least one correlation between the activation signal and the at least one pressure condition;

means for forming the at least one activation signal as a function of the deviation and the at least one correlation; and means for modifying the at least one correlation as a function of the operating characteristics of the braking system.

13. The device according to claim 12, wherein the means for storing includes a memory device.

14. The device according to claim 12, further comprising means for determining the at least one correlation by using a plurality of predetermined activation signals and a corresponding plurality of pressure conditions resulting from the plurality of predetermined activation signals to form the at least one correlation.

15. The device according to claim 12, further comprising means for determining, upon a commissioning, the at least one correlation in a test cycle by using a plurality of predetermined reference pressure values and a corresponding plurality of activation signals resulting from the plurality of predetermined reference pressure values to form the at least one correlation.

16. A method for regulating a pressure of at least one brake of a braking system having a valve arrangement, the method comprising the steps of:

determining a reference pressure;

determining an actual pressure of the at least one brake;

comparing the reference pressure to the actual pressure;

determining a pressure condition based on the comparing step;

determining a correcting pressure based on at least the pressure condition and the comparing step;

determining another pressure condition based on at least the correcting pressure;

providing a characteristic curve, which defines a relationship between an actuation signal for driving the valve arrangement and the another pressure condition;

determining the actuation signal corresponding to the another pressure condition;

modifying the characteristic curve based on at least the actuation signal and the another pressure condition; and outputting the actuation signal for the valve arrangement.

17. A method for regulating a pressure of at least one brake of a braking system having a valve arrangement, the method comprising the steps of:

determining a reference pressure;

determining an actual pressure of the at least one brake;

comparing the reference pressure to the actual pressure;

determining a pressure condition based on the comparing step;

determining a correcting pressure based on at least the pressure condition and the comparing step;

determining another pressure condition based on at least the correcting pressure;

providing a characteristic curve, which defines a relationship between an actuation signal for driving the valve arrangement and the another pressure condition;

determining the actuation signal corresponding to the another pressure condition and producing a determined actuation signal;

correcting the determined actuation signal based on the comparing step and producing a corrected actuation signal;

modifying the characteristic curve based on at least the corrected actuation signal and the another pressure condition; and outputting the corrected actuation signal for the valve arrangement.

18. An apparatus for regulating a pressure of at least one brake of a braking system having a valve arrangement, the apparatus comprising:

means for determining a reference pressure;

means for determining an actual pressure of the at least one brake;

means for comparing the reference pressure to the actual pressure and for producing a comparison of the reference pressure to the actual pressure;

means for determining a pressure condition based on the comparison;

means for determining a correcting pressure based on at least the pressure condition and the comparison;

means for determining another pressure condition based on at least the correcting pressure;

means for providing a characteristic curve, which defines a relationship between an actuation signal for driving the valve arrangement and the another pressure condition;

means for determining the actuation signal corresponding to the another pressure condition;

means for modifying the characteristic curve based on at least the actuation signal and the another pressure condition; and means for outputting the actuation signal for the valve arrangement.

19. The apparatus of claim 18, further comprising:

means for determining another reference pressure;

means for comparing the correcting pressure to the another reference pressure and for producing a comparison of the correcting pressure and the another reference pressure;

wherein the means for modifying modifies the characteristic curve based on at least the comparison of the correcting pressure and the another reference pressure.

* * * * *